United States Patent Office 3,260,658
Patented July 12, 1966

3,260,658
PROCESS FOR THE RECOVERY OF RHENIUM
Philip E. Churchward, Salt Lake City, Utah, assignor to the United States of America as represented by the Secretary of the Interior
No Drawing. Filed Oct. 31, 1962, Ser. No. 234,566
16 Claims. (Cl. 204—109)

The invention herein described and claimed may be manufactured and used by or for the Government of the United States of America for governmental purposes without the payment of royalties thereon or therefor.

This invention relates to a process for electrowinning rhenium from an aqueous solution.

The only present commercial sources of rhenium are certain molybdenite ores which contain the element in minute amount. When the molybdenite is roasted, rhenium is volatilized as the oxide and is recovered as a water solution obtained by scrubbing the flue gases or by leaching the flue dust. A recent process absorbs the rhenium from this solution on an ion exchange resin. An alternative process for recovery of the rhenium from the water solution which has been found to be very effective is described and claimed in applicant's copending application Serial No. 234,567, filed of even date herewith. This process utilizes solvent extraction with a solution of a quaternary ammonium salt in an organic solvent.

In either of the above methods the rhenium is subsequently obtained in water solution by stripping the resin or organic solvent with perchloric acid, the resulting solution consisting of a perchloric acid solution of perrhenic acid.

The conventional procedure for finally recovering the rhenium from the perchloric acid solution is to precipitate it with hydrogen sulfide, filter, redissolve the sulfide with ammonium hydroxide and an oxidizing agent, and crystallize ammonium perrhenate from the resulting solution. Rhenium metal is then prepared by hydrogen reduction of the ammonium perrhenate. Since this process is decidedly laborious and time consuming, a simplified process for rhenium recovery was needed.

It has now been found that rhenium may be simply and rapidly recovered from a suitably modified perchloric acid solution by means of electrodeposition. According to the invention the perchloric acid solution of rhenium is modified by the addition of an inorganic sulfate of ammonia or an alkali metal prior to electrodeposition of the rhenium.

The modified rhenium-containing perchloric acid solution is electrolyzed in a conventional electrolytic cell at a current density greater than 100 amperes per square foot, preferably 300 to 400 amperes per square foot, using an inert anode and any suitable cathode such as copper or stainless steel; the product is a compact metallic deposit of rhenium.

The process of the invention has the further advantage that the perchloric acid may be recycled, thus conserving a relatively expensive reagent. When the metal content of the perchloric acid solution has been reduced to a suitably low value by electrolysis, the spent electrolyte is replenished with rhenium by using it as the stripping agent in the above described removal of rhenium from ion-exchange resin or organic solvent. Thus, a simple and economical closed circuit stripping-electrolytic rhenium recovery system is achieved.

Though the concentration of the inorganic sulfate may vary considerably, e.g., from about 0.5 to 1.5 molar, a 1-molar concentration has been found satisfactory for most applications of the process. As an alternative procedure, the sulfate may be added to the stripping reagent before it is used to strip rhenium from the resin or organic solvent.

Sodium and ammonium sulfate have been found to be particularly effective. Lithium sulfate is also satisfactory. Potassium sulfate may also be used but is less economical and less desirable because of the relative insolubility of potassium perrhenate. Cesium and rubidium perrhenates are even less soluble. Sulfuric acid is not effective in the process, nor is magnesium sulfate.

The following example will serve to more particularly describe the invention.

Example

A perchloric acid solution of perrhenic acid was prepared by stripping a rhenium-loaded organic solution with perchloric acid. The organic solution was obtained by extraction of rhenium with a kerosine-quaternary ammonium salt (Aliquat 336) extractant, as more particularly described in the above-mentioned application Serial No. 234,567.

The loaded strip solution contained 18 grams per liter rhenium and was about 0.9 molar in perchloric acid. This solution was electrolyzed using a platinum anode and a copper wire cathode, the cathode area being 0.8 square inch. Reaction conditions were varied in order to demonstrate the effect of variations in current density and the addition of the sodium or ammonium sulfate. The results are given in the following table.

ELECTRODEPOSITION OF RHENIUM FROM PERCHLORATE STRIP SOLUTIONS CONTAINING ADDED SULFATES

| Current density, amperes per square foot | Salt addition, 1 molar | Current efficiency, percent | Deposit |
|---|---|---|---|
| 90 | $Na_2SO_4$ | 3.0 | Gray, metallic. |
| 180 | $Na_2SO_4$ | 8.2 | Bright metal. |
| 360 | $Na_2SO_4$ | 13.7 | Do. |
| 720 | $Na_2SO_4$ | 5.2 | Dark rough deposit. |
| 90 | $(NH_4)_2SO_4$ | 3.4 | Black, nonmetallic. |
| 360 | $(NH_4)_2SO_4$ | 19.4 | Good metallic deposit. |
| 360 | $MgSO_4$ | .04 | Black. |

The effect of the process of the invention in obtaining a satisfactory deposit of the rhenium is evident from the results shown in the table.

By way of contrast, electrolysis of the same strip solution without addition of the sodium or ammonium sulfate resulted in formation of only very thin, black, nonmetallic deposits at current densities from 25 to 400 amperes per square foot and at temperatures from room temperature to 70° C.

Addition of NaOH to the same strip solution was likewise found to be ineffective, subsequent electrolysis resulting in formation of no metallic deposit.

The depleted electrolyte from the above electrolysis was used instead of fresh perchloric acid solution to strip rhenium from the organic solvent mentioned above and was found to be very effective for this purpose. A neutral perchlorate solution such as sodium perchlorate may also be used for stripping and the strip solution acidified for electrolysis by the addition of another acid such as sulfuric acid to give an electrolyte of essentially the same composition as that of the example.

Temperature is not critical in the process of the invention. Room temperature is ordinarily employed; however, temperatures up to 90° C. can be used.

It is thus apparent that applicant has developed a simple, effective and economical process for recovery of rhenium from acid strip solutions which should substantially increase commercial availability and economy of metallic rhenium.

What is claimed is:

1. A method for electrowinning rhenium from a rhenium-containing perchloric acid solution comprising adding to said solution an inorganic sulfate from the group consisting of ammonium sulfate and an alkali metal sulfate and electrolyzing the resulting solution to deposit metallic rhenium on the cathode employed in the electrolysis.

2. The method of claim 1 in which the perchloric acid solution of rhenium is obtained by stripping a rhenium-containing material with perchloric acid.

3. The method of claim 2 in which the rhenium-containing material is selected from the group consisting of an ion exchange resin and an organic solvent-quaternary ammonium salt extractant.

4. The method of claim 1 in which the inorganic sulfate is sodium sulfate.

5. The method of claim 1 in which the inorganic sulfate is ammonium sulfate.

6. The method of claim 1 in which the inorganic sulfate is added in an amount of about 1 mole per liter.

7. The method of claim 1 in which the electrolysis is conducted at a current density of about 300 to 400 amperes per square foot.

8. A method for recovering rhenium from a rhenium-containing material comprising stripping said material with perchloric acid solution to form a rhenium-containing perchloric acid solution, adding to said solution an inorganic sulfate from the group consisting of ammonium sulfate and an alkali metal sulfate and electrolyzing the resulting solution to deposit metallic rhenium on the cathode.

9. The method of claim 8 in which the rhenium-containing material comprises an ion exchange resin.

10. The method of claim 8 in which the rhenium-containing material comprises an organic solvent-quaternary ammonium salt extractant.

11. The method of claim 8 in which the inorganic sulfate is sodium sulfate.

12. The method of claim 8 in which the inorganic sulfate is ammonium sulfate.

13. The method of claim 8 in which the inorganic sulfate is added in an amount of about 1 mole per liter.

14. The method of claim 8 in which the electrolysis is conducted at a current density of about 300 to 400 amperes per square foot.

15. The method of claim 8 in which the inorganic sulfate is added to the perchloric acid solution prior to the stripping operation.

16. The method of claim 8 in which the spent perchloric acid-inorganic sulfate solution from the electrolysis step is recycled and used for stripping rhenium from the rhenium-containing material.

References Cited by the Examiner

UNITED STATES PATENTS 2,138,573  11/1938  Fink et al. _____ 204—47

OTHER REFERENCES

J. Am. Chem. Soc. 75: 2869–72, 2873–7 (1953).
Anal. Chem., 26: 1911–14 (1954).

JOHN H. MACK, *Primary Examiner.*

MURRAY TILLMAN, *Examiner.*

L. G. WISE, H. M. FLOURNOY, *Assistant Examiners.*